(12) United States Patent
Sasaki et al.

(10) Patent No.: US 8,191,794 B2
(45) Date of Patent: Jun. 5, 2012

(54) FLOW CHANNEL SWITCHING DEVICE

(75) Inventors: Kazumichi Sasaki, Toyota (JP);
Akiharu Abe, Toyota (JP); Manabu Hasegawa, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 746 days.

(21) Appl. No.: 12/308,072

(22) PCT Filed: Jun. 13, 2007

(86) PCT No.: PCT/IB2007/001575
§ 371 (c)(1),
(2), (4) Date: Jan. 12, 2009

(87) PCT Pub. No.: WO2007/144746
PCT Pub. Date: Dec. 21, 2007

(65) Prior Publication Data
US 2009/0272441 A1    Nov. 5, 2009

(30) Foreign Application Priority Data

Jun. 14, 2006   (JP) .................................. 2006-165005

(51) Int. Cl.
*G05D 23/02* (2006.01)
*G05D 23/12* (2006.01)
*G05D 23/275* (2006.01)

(52) U.S. Cl. .................. 236/99 K; 236/93 A; 236/93 R; 236/99 J; 236/99 R; 236/100; 137/468

(58) Field of Classification Search ................ 236/93 A, 236/93 R, 99 J, 99 K, 99 R, 100; 137/468
See application file for complete search history.

(56) References Cited

U.S. PATENT DOCUMENTS

| 3,112,002 A | * | 11/1963 | Van Der Lely | .............. 180/68.2 |
| 3,120,926 A | * | 2/1964 | Gobien et al. | ................ 236/34.5 |
| 4,895,301 A |  | 1/1990 | Kennedy | |

FOREIGN PATENT DOCUMENTS

| CN | 1743706 A | 3/2006 |
| EP | 0 214 938 A2 | 3/1987 |
| EP | 0 890 717 A2 | 1/1999 |
| JP | Y-45-31995 | 12/1970 |
| JP | U-51-37319 | 3/1976 |

(Continued)

OTHER PUBLICATIONS

Japanese Decision of Refusal issued in Japanese Application No. 2008-254370 on Mar. 8, 2011.

(Continued)

*Primary Examiner* — Cheryl J Tyler
*Assistant Examiner* — Jonathan Bradford
(74) *Attorney, Agent, or Firm* — Oliff & Berridge PLC

(57) ABSTRACT

A flow channel switching device provided in an oil circuit to switch the oil flow channel in accordance with the temperature of the oil. The flow channel switching device includes: a thermo-valve case that includes a plurality of flow passages that are communicated outside of the case; and a cylinder that is formed to move in the thermo-valve case and switches the oil flow channel in accordance with the temperature of the oil. The cylinder moves to a predetermined position and is fixed by means of an external member when the fluid at a low temperature is fed into the fluid circuit.

13 Claims, 11 Drawing Sheets

FOREIGN PATENT DOCUMENTS

| | | |
|---|---|---|
| JP | A-61-4816 | 1/1986 |
| JP | U-63-82029 | 5/1988 |
| JP | A-64-15587 | 1/1989 |
| JP | U-1-98365 | 6/1989 |
| JP | A-1-275982 | 11/1989 |
| JP | A-6-17633 | 1/1994 |
| JP | U-6-16788 | 3/1994 |
| JP | A-10-196841 | 7/1998 |
| JP | A-2006-64155 | 3/2006 |
| WO | WO 2005/103508 A1 | 11/2005 |

OTHER PUBLICATIONS

Japanese Office Action issued in Japanese Patent Application No. 2006-165005 on Apr. 22, 2008.

Japanese Office Action issued in Japanese Patent Application No. 2008-254370 (divisional of Japanese Patent Application No. 2006-165005) on Oct. 14, 2010.

Chinese Office Action issued in Chinese Patent Application No. CN 200780022334.7 dated Jun. 21, 2010.

* cited by examiner

FLOW CHANNEL SWITCHING DEVICE

BACKGROUND OF THE INVENTION

1. Field of the Invention

The invention relates to a flow channel switching device that switches the flow channel of a fluid according to the temperature of the fluid.

2. Description of the Related Art

A valve for switching a flow channel is provided in a fluid circuit. Among various valves, a so-called thermo-valve that switches the flow channel according to the temperature of the fluid is typically used at a point at which two or more passages intersect. A thermo-valve switches a flow channel from one to the other according to the temperature of the fluid flowing through the thermo-valve. A thermo-valve is provided for, for example, a heat exchanger for an automatic transmission in a motor vehicle.

Japanese Utility Model Application Publication No. 1-98365 (hereinafter referred to as "JP-U-1-98365") describes a transmission oil cooling apparatus that suppresses an increase in the temperature of the transmission oil by circulating the transmission oil through an oil pump, a circulation passage and an oil cooler that is provided in the circulation passage. The transmission oil cooling apparatus has a bypass passage bypassing the oil cooler. An automatic switching valve is provided at the connection portion between the bypass passage and the circulation passage. When the oil temperature is low, the automatic switching valve introduces the oil discharged from the oil pump to the bypass passage while preventing the oil from flowing into the oil cooler. When the oil temperature is high, the automatic switching valve introduces the oil discharged from the oil pump to the oil cooler while preventing the oil from flowing into the bypass passage. According to JP-U-1-98365, it is described that the transmission oil cooling apparatus can maintain the oil temperature within a desired temperature range, and can quickly increase the oil temperature when the oil temperature is low.

Meanwhile, Japanese Patent Application Publication No. 2006-64155 (hereinafter, referred to as "JP-A-2006-64155") describes a heat exchanging system for an automatic transmission. The heat exchanging system is configured to cool the automatic transmission and the oil discharged from the automatic transmission. The heat exchanging system includes a first heat exchanger provided on the upstream side, a second heat exchanger provided the downstream side, a thermovalve that can supply the automatic transmission with at least one of the oil that underwent the heat exchange at the first heat exchanger and the oil that underwent the heat exchange at the second heat exchanger. According to the heat exchanging system, when the oil temperature is relatively low, the thermo-valve establishes a flow channel in which the oil passed through the first heat exchanger returns to the automatic transmission while the oil passed through the second heat exchanger is interrupted to return to the automatic transmission. Conversely, when the oil temperature is relatively high, the thermo-valve establishes a flow channel in which the oil passes through both the first and second heat exchangers and then returns to the automatic transmission. According to JP-A-2006-64155, it is described that the heat exchanging system can stabilize the oil temperature.

Meanwhile, a thermo-valve is structured to switch a flow channel between a circuit communicated when the fluid temperature is low and a circuit communicated when the fluid temperature is high. When forming a fluid circuit during production, pipes and valves are first assembled together to form passages of the fluid circuit, and then the fluid circuit is filled up. However, when the fluid circuit is filled externally with the fluid at a low temperature, for example, the thermovalve may prevent the fluid from flowing into the fluid circuit that is communicated at a high temperature.

For example, at a room temperature, the passages that circulates the fluid at a low temperature are open while the passages that circulates the fluid at a high temperature are closed. Therefore, when the fluid circuit is filled externally with the fluid at a room temperature, the fluid is prevented from flowing into the passages that are opened at a high temperature. That is, it is difficult to fill up completely the passages that are opened only at a high temperature with the fluid at a low temperature.

Therefore, for example, both the circuit that is opened at a low temperature and the circuit that is opened at a high temperature may be filled up in such a manner that after filling a portion of the fluid circuit with the fluid at a low temperature, the other portion of the fluid circuit is filled up externally with the fluid heated up to a high temperature. According to this manner, however, it takes excessively a long time to fill up the fluid circuit completely because the fluid needs to be heated.

Also, the thermo-valve may be configured to be controlled electrically such that a valve body of the thermo-valve moves from a position for low temperature to a position for high temperature even if the fluid is still at a low temperature. In this case, however, the structure of the thermo-valve becomes complicated and the cost of the thermo-valve increases.

SUMMARY OF THE INVENTION

The invention provides a flow channel switching device that even though the temperature of a fluid is low, the fluid may be fed into a fluid circuit that is communicated when the temperature of the fluid is high.

An aspect of the invention relates to a flow channel switching device that is provided in a fluid circuit and switches a flow channel of a fluid in accordance with the temperature of the fluid. The flow channel switching device comprises: a case that includes a plurality of flow passages that is communicated outside; and a valve body that is formed to move in the case, and switches the flow channel of the fluid in accordance with the temperature of the fluid. Specifically, the valve body moves to a predetermined position and is fixed by means of an external member when the fluid at a low temperature is fed into the fluid circuit.

Here, the external member may be removable. The flow passages may include a first input passage that is open when the temperature of the fluid is low, and a second input passage that is open when the temperature of the fluid is high. The predetermined position may be a position where the valve body is seated when the first input passage is blocked.

Further, the fluid circuit may be a hydraulic circuit for an automatic transmission, or may be a coolant circuit for an internal combustion engine. Also, the valve body may include first closing means for blocking the first input passage, and second closing means for blocking the second input passage. The second closing means may be forced to move when a fluid is fed into the fluid circuit, and the second input passage opens.

The flow channel switching device descried above may further include: a shaft that supports the valve body such that the valve body moves in a predetermined direction; and a wax that is provided in a space surrounded by the valve body and the shaft, the wax expands and contracts in accordance with the temperature of the fluid. The valve body may be moved in the predetermined direction by the wax expanding. A portion of the shaft may be inserted in the valve body while the other portion of the shaft is exposed to the outside of the case. The shaft may be supported by the case to move in the predetermined direction. When the fluid is fed into the fluid circuit, the valve body may be moved in the predetermined direction by pushing the shaft inward, whereby the first input passage is blocked and the second input passage is opened.

The shaft may be fixed by the external member in a state that the shaft is pushed in the predetermined direction.

Further, the flow channel switching device descried above may further include an biasing member that biases the valve body in a direction opposite to pushing the shaft inward. The external member may be a pin having an elongated shape. The case may have an insert hole into which the pin is inserted. The pin may be inserted into the insert hole in a state that the shaft is pushed inward, whereby an end face of the shaft contacts with the inserted pin and the shaft is fixed. Also, the case may further include a protruding portion that has a plurality of the insert holes extending in different directions from the adjacent insert holes.

The case may have a concave portion that is formed to expose the other portion of the shaft to the outside of the case. The external member also may be a screw member. The screw member may be screwed into the concave portion. The shaft may be pushed in the predetermined direction by screwing the screw member into the concave portion when the fluid is fed into the hydraulic circuit.

According to the invention, even though the temperature of a fluid is low, the fluid may be fed into a fluid circuit that is communicated only when the temperature of the fluid is high.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Hereinafter, a flow channel switching device (will be simply referred to as "thermo-valve") according to the first example embodiment of the invention will be described with reference to FIG. 1 to FIG. 7. The thermo-valve 30 of the first example embodiment is provided in a hydraulic circuit for an automatic transmission in a motor vehicle. The hydraulic circuit of the first example embodiment involves heat exchangers.

Figure 1:
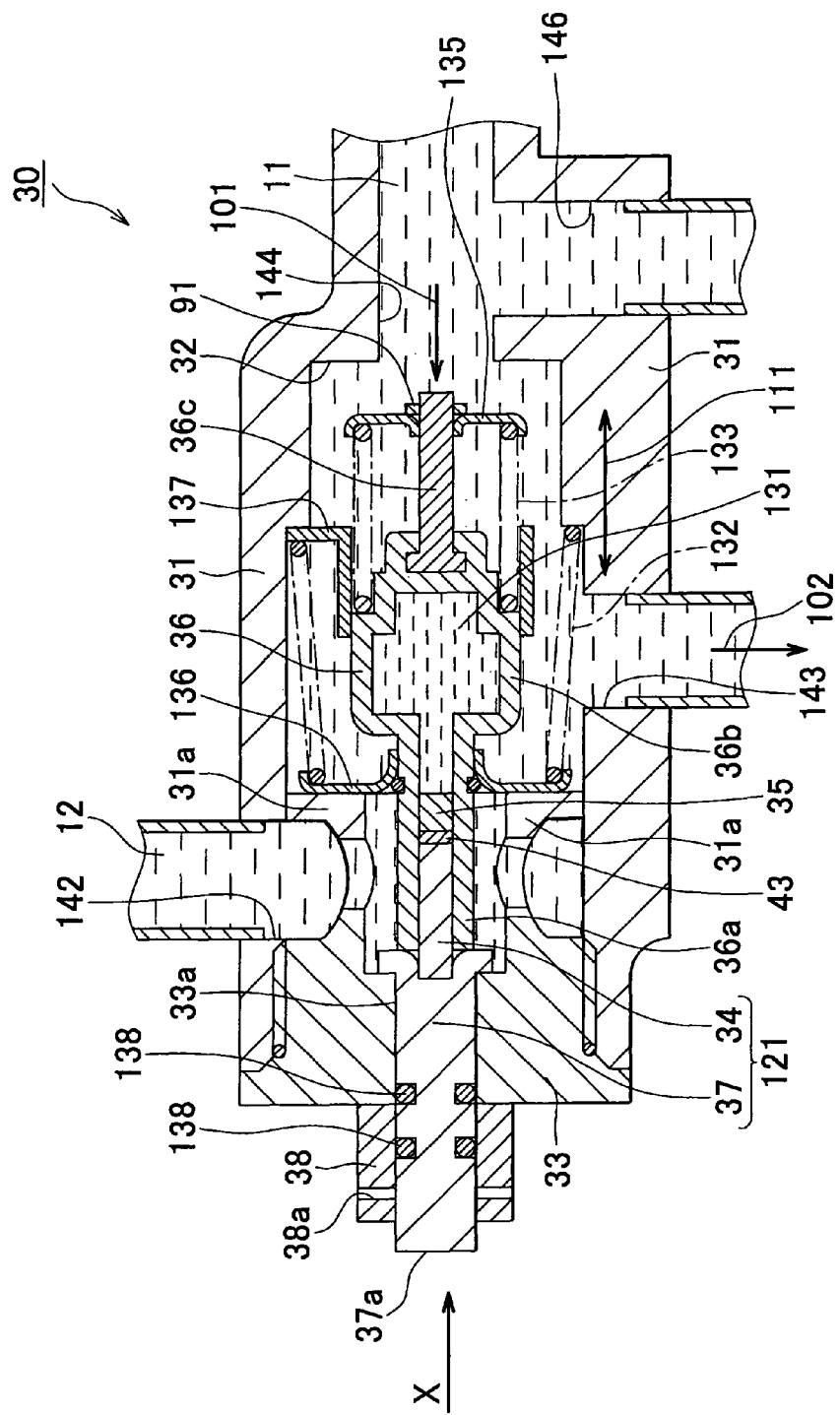
FIG. 1 is a cross-sectional view showing a flow channel switching device of the first example embodiment when the temperature of the oil in the hydraulic circuit is low.

FIG. 1 is a cross-sectional view showing the thermo-valve 30 when the temperature of the oil in the hydraulic circuit (hereinafter referred to as "hydraulic oil") is low. The thermo-valve 30 has a thermo-valve case 31 and a lid body 33. An inner space 32 of the thermo-valve case 31 is formed hallow and serves as an oil passage. The lid body 33 is arranged to seal one side of the inner space 32 such that the inner space 32 is separated from the outside.

The thermo-valve case 31 has, as flow passages communicated outside, a second input port 142, a first input port 144, and a first output port 143. The second input port 142, the first input port 144, and the first output port 143 are formed to communicate with the inner space 32, and the oil is delivered to and from other components in the hydraulic circuit through the second input port 142, the first input port 144, and the first output port 143.

Further, the thermo-valve case 31 has a second output port 146 that communicates with a second heat exchanger 50. As will be described later, the second output port 146 is formed such that the hydraulic oil flowing into the second output port 146 from a first heat exchanger 40 flows toward the second heat exchanger 50 without passing through the inner space 32 in the thermo-valve 30.

In the first example embodiment, the thermo-valve 30 has a cylinder 36 that serves as a valve body. The cylinder 36 has a hollow inside. The cylinder 36 is arranged in the inner space 32 of the thermo-valve case 31.

The cylinder 36 has a shaft slide portion 36a. The shaft slide portion 36a is cylindrical. The shaft slide portion 36a is slidably supported on a shaft 121 that is provided in the thermo-valve 30.

The shaft 121 includes a thermo-element shaft 34. The shaft slide portion 36a is slidably supported on the thermo-element shaft 34. The cylinder 36 is movable along the direction indicated by the arrow 111. At least a portion of the thermo-element shaft 34 may be inserted in the cylinder 36. The inside of the cylinder 36 is filled with a wax 131. The wax 131 is hermetically sealed in the space surrounded by the shaft 121 and the cylinder 36.

A gasket 35 is attached via a back-up plate 43 to an end portion of the thermo-element shaft 34, which is closer to the inside of the cylinder 36. The gasket 35 is formed such that the wax 131 in the cylinder 36 is prevented from leaking out.

The wax 131 may be, for example, a paraffin wax. The wax 131 contracts as its temperature decreases and expands as its temperature increases. Specifically, the wax 131 of the first example embodiment is solid when the temperature of the hydraulic oil is low and liquefies as the temperature of the hydraulic oil increases. That is, the wax 131 may be regarded as a substance that changes its volume according to its temperature.

The thermo-valve 30 has a passage closing member 135, which corresponds to "first closing means". The passage closing member 135 closes the first input port 144 by contacting the opening portion of the first input port 144. The cylinder 36 has a closing member slide portion 36c that faces the first input port 144. The closing member slide portion 36c protrudes from the front-end portion of the cylinder 36. A stopper 91 is provided at the front-end portion of the closing member slide portion 36c. The stopper 91 is formed such that the passage closing member 135 is prevented from falling out of the closing member slide portion 36c.

The passage closing member 135 is arranged around the closing member slide portion 36c. The passage closing member 135 has contact with the closing member slide portion 36c and moves slidably along the closing member slide portion 36c. Further, the passage closing member 135 is biased by a valve spring 133, which corresponds to a "biasing member", toward the first input port 144. One end portion of the valve spring 133 is in contact with the end face of the cylinder 36 and the other end portion of the valve spring 133 is in contact with the passage closing member 135.

In the first example embodiment, the thermo-valve 30 also has a passage closing member 136, which corresponds to "second closing means". The thermo-valve case 31 has a contact portion 31a that is arranged to face the passage closing member 136. The contact portion 31a protrudes from the sidewall of the inner space 32 in the thermo-valve case 31 toward the inside of the inner space 32.

The cylinder 36 is biased by a return spring 132, which is another biasing member, toward a direction opposite to the direction indicated by the arrow X in FIG. 1 in which the shaft 121 is pushed inward. The passage closing member 136 is biased by the return spring 132 toward the contact portion 31a. Incidentally, A spring engaging member 137 is provided in the inner space 32 of the thermo-valve case 31. The spring engaging member 137 is formed to establish the position of the return spring 132 on one side. Further, the spring engaging member 137 is fixed, and therefore does not move while the cylinder 36 is moving. The cylinder 36 includes an engaging member slide portion 36b. The spring engaging member 137 slides on the surface of the engaging member slide portion 36b.

The shaft 121 further includes a pushing shaft 37 for pushing the thermo-element shaft 34. In the first example embodiment, the thermo-element shaft 34 and the pushing shaft 37 are joined together and thus move together.

The lid body 33 has a protruding portion 38 that protrudes toward an outer direction of the lid body 33 opposite to the direction indicated by the arrow X in FIG. 1. Also, the lid body 33 has a through hole 33a. The pushing shaft 37 is inserted into the through hole 33a. The shaft 121 passes through the through hole 33a of the lid body 33, and a portion of the shaft 121 is exposed to the outside. The shaft 121 is supported by the lid body 33 such that the shaft 121 may move back and forward along the directions indicated by the arrow 111. Further, the thermo-valve 30 has another gasket 138 (e.g., O-ring). The gasket 138 is arranged so as to prevent the hydraulic oil from leaking out between the pushing shaft 37 and the through hole 33a.

The pushing shaft 37 has a flat end face 37a. An insert hole 38a is formed in the protruding portion 38 of the lid body 33. In the first example embodiment, a plurality of the insert holes 38a is provided. A pin 139 having an elongated shape, which will be described later, may be inserted into the insert holes 38a.

Figure 2:
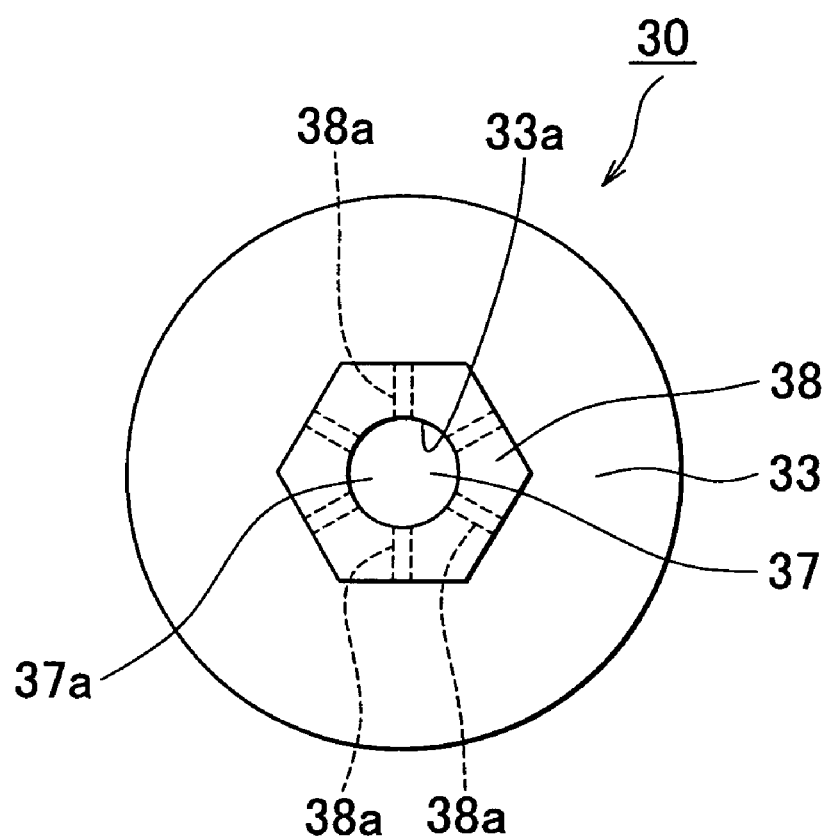
FIG. 2 is a side view showing the flow channel switching device of the first example embodiment as viewed from the direction indicated by the arrow X in FIG. 1.

FIG. 2 is a side view showing the thermo-valve 30 of the first example embodiment as viewed from the direction indicated by the arrow X in FIG. 1. Referring to FIG. 2, a side face of the lid body 33 is formed to be circular, and a side face of the protruding portion 38 of the lid body 33 is formed to be hexagonal. Here, the shape of the protruding portion 38 is not limited to a hexagonal shape. Each of the insert holes 38a is formed to extend in a different direction from the adjacent insert hole 38a, and to reach the through hole 33a into which the shaft 121 is inserted.

Referring to FIG. 1 and FIG. 2, the pushing shaft 37 is formed such that the pin 139 that is inserted into the insert holes 38a, which will be described later, contacts the end face 37a of the pushing shaft 37 when the passage closing member 135 is in contact with the opening portion of the first input port 144 by pushing the pushing shaft 37 inward.

FIG. 1 shows the state that the temperature of the hydraulic oil introduced from the first input port 144 is low. The passage closing member 136 is in contact with the contact portion 31a by the elastic force of the return spring 132. The end portion of the pushing shaft 37 having the end face 37a protrudes from the protruding portion 38 and thus is exposed to the outside. The passage closing member 136 is in contact with the contact portion 31a, and thus the second input port 142 is under a closed state. That is, the flow channel of the hydraulic oil 12 introduced from the second input port 142 is interrupted. On the other hand, the first input port 144 and the first out port 143 are under an open state.

A hydraulic oil 11 introduced from the first input port 144 flows into the inner space 32 as indicated by the arrow 101. Then, the hydraulic oil that is flowed into the inner space 32 flows out of the first out port 143 as indicated by the arrow 102. Because the temperature of the hydraulic oil 11 is low, the temperature of the wax 131 in the cylinder 36 is also low, and thus remains unexpanded.

Figure 3:
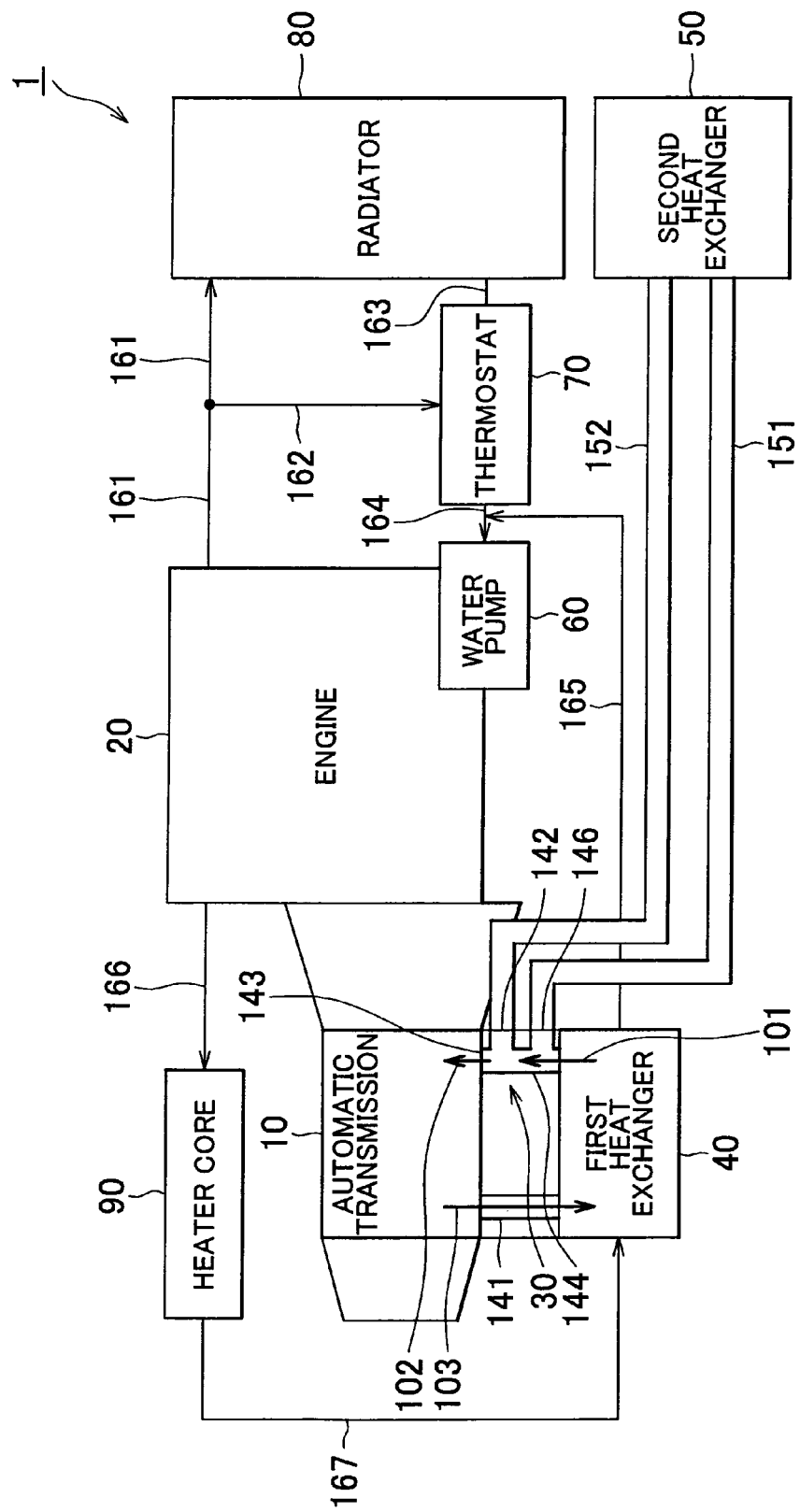
FIG. 3 is a block diagram showing a drive system in the first example embodiment when the temperature of the oil in the hydraulic circuit is low.

FIG. 3 is a block diagram showing a drive system 1 in the first example embodiment when the temperature of the hydraulic oil is low. The drive system 1 in the first example embodiment has an engine 20 that generates drive power, and an automatic transmission 10 that receives the driver power from the engine 20 and converts the revolutions and the rotational torques of the engine 20. The engine 20 is a drive power source and may be either a gasoline engine or a diesel engine. Further, the engine 20 may be an external combustion engine, rather than an internal combustion engine. Furthermore, the engine 20 may be configured by a motor-generator.

The torque output from the engine 20 is converted at the automatic transmission 10. The automatic transmission 10 may be constituted by a torque converter and planetary gearsets. Alternatively, the automatic transmission 10 may be a continuously variable transmission. Also, the automatic transmission 10 may be constituted such that a plurality of constant-meshed gears or selective-sliding gears is provided and the engagement among the gears changes automatically.

The engine 20 is cooled by coolant (e.g., long-life coolant). The engine 20, a radiator 80, a thermostat 70, a water pump 60, a heater core 90, and the first heat exchanger 40 are connected via coolant passages 161 to 167 in which the coolant circulates.

The water pump 60 is attached to the engine 20. The thermostat 70 and the radiator 80 are provided upstream of the water pump 60. The thermostat 70 adjusts the amount of coolant to be supplied to the radiator 80 in accordance with the coolant temperature. The radiator 80 radiates the heat of the coolant to the ambient air.

The coolant from the water pump 60 is introduced into the lower portion of the engine 20. Then the coolant is divided into two flow channels from the upper portion of the engine 20, and the coolant is discharged out of the engine 20. In one flow channel, the coolant flows into the radiator 80 through the coolant passage 161. Then, the coolant flows from the radiator 80 into the thermostat 70 via the coolant passage 163. The coolant out of the thermostat 70 returns to the water pump 60 via the coolant passage 164. Meanwhile, a portion of the coolant passes through the coolant passage 162, which branches from the coolant passage 161, flows directly into the thermostat 70 bypassing the radiator 80.

In the other flow channel, the coolant that is discharged from the engine 20 flows into the heater core 90 via the coolant passage 166. At the heater core 90, the heat of the coolant is radiated into the vehicle compartment, thus warming the vehicle compartment. Then, the coolant out of heater core 90 flows into the first heat exchanger 40 via the coolant passage 167. At the first heat exchanger 40, heat exchange is performed between the coolant and the hydraulic oil. Then, the coolant returns to the water pump 60 via the coolant passage 165.

An automatic transmission fluid (ATF) for lubricating the respective parts and components in the automatic transmission 10 and for transmitting the driver power flows inside the automatic transmission 10. The hydraulic oil that flows through the thermo-valve 30 in the first example embodiment is the automatic transmission fluid for the automatic transmission 10. The automatic transmission 10 is connected to the first heat exchanger 40 via an oil passage 141.

The thermo-valve 30 is connected to the automatic transmission 10. The thermo-valve 30 switches the flow channel of the hydraulic oil from one to the other. The thermo-valve case 31 is attached to the outside of the automatic transmission 10.

The thermo-valve 30 is also connected to the first heat exchanger 40. Further, the first heat exchanger 40 is connected to the heater core 90 via a coolant passage 167. The first heat exchanger 40 performs heat exchange between the coolant flowing from the heater core 90 and the hydraulic oil for the automatic transmission 10. The thermo-valve 30 in the first example embodiment is arranged between the automatic transmission 10 and the first heat exchanger 40.

The hydraulic oil outlet of the first heat exchanger 40 is connected to an oil passage 151 via the second output port 146 formed in the thermo-valve case 31. The oil passage 151 is connected to the second heat exchanger 50. The second heat exchanger 50 cools the hydraulic oil by means of air-cooling. The hydraulic oil outlet of the second heat exchanger 50 is connected to the oil passage 152. The oil passage 152 is connected to the second input port 142 of the thermo-valve 30.

That is, referring to FIG. 1 and FIG. 3, the first input port 144 of the thermo-valve 30 is connected to the first heat exchanger 40. The second input port 142 of the thermo-valve 30 is connected to the oil passage 152. The first out port 143 of the thermo-valve 30 is connected to the automatic transmission 10.

The hydraulic oil flowing inside the automatic transmission 10 discharges out of the automatic transmission 10, and flows into the first heat exchanger 40 via the oil passage 141 as indicated by the arrow 103. Then, after the heat exchange is performed between the hydraulic oil and the coolant at the first heat exchanger 40, the cooled hydraulic oil enters the thermo-valve 30 via the first input port 144 as indicated by the arrow 101.

Thus, the cooled hydraulic oil after passing through the first heat exchanger 40 enters the thermo-valve 30, and returns to the automatic transmission 10 via the thermo-valve 30 without passing through the second heat exchanger 50. Namely, when the temperature of the hydraulic oil is low, the second input port 142 of the thermo-valve 30 remains closed, and therefore the hydraulic oil is not circulated through the oil passage 151, the oil passage 152, and the second heat exchanger 50. That is, when the temperature of the hydraulic oil is low, the hydraulic oil does not flow out from the second output port 146 formed in the thermo-valve case 31.

Figure 4:
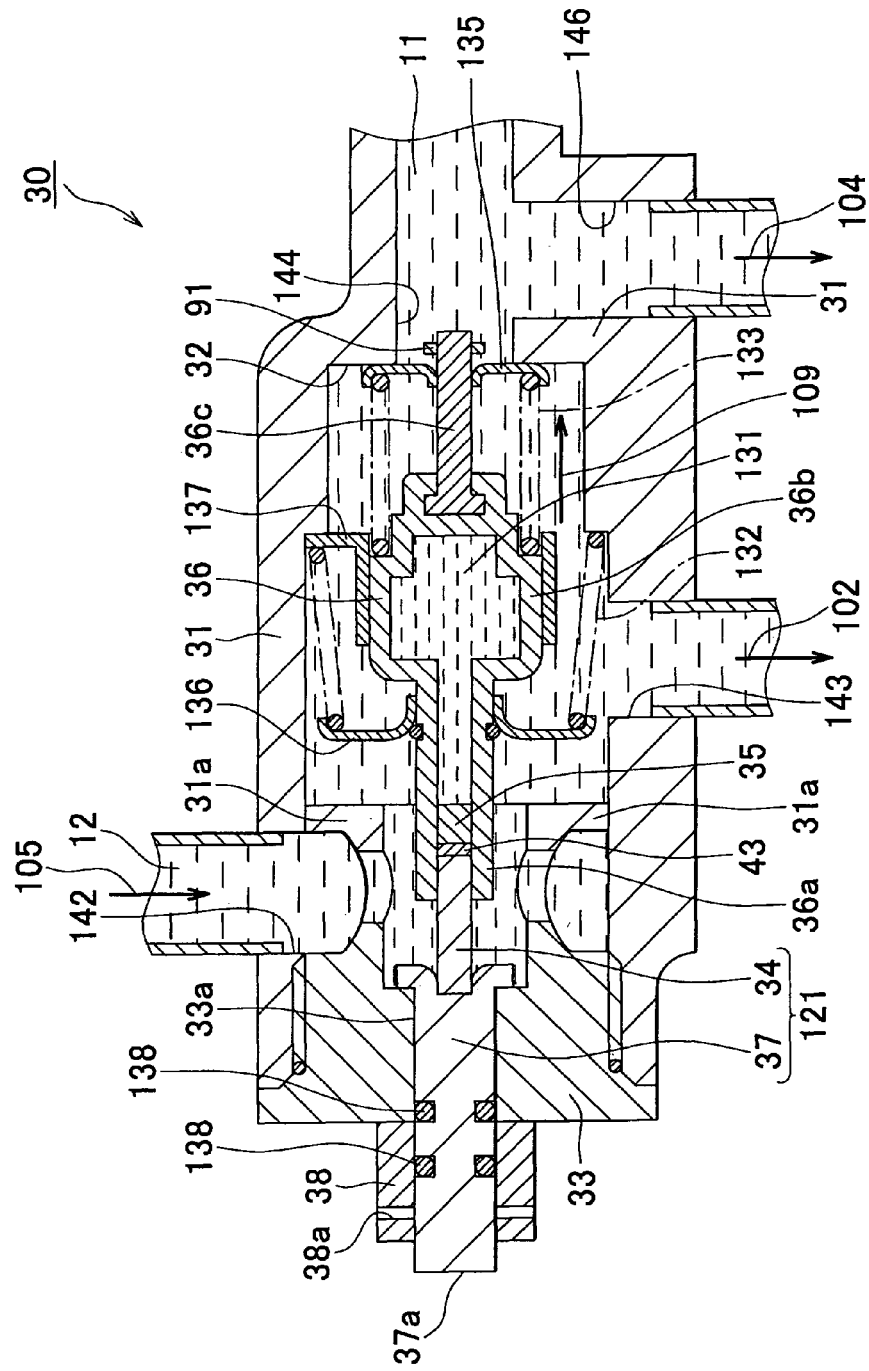
FIG. 4 is a cross-sectional view showing the flow channel switching device of the first example embodiment when the temperature of the oil in the hydraulic circuit is high.

FIG. 4 is a cross-sectional view showing the thermo-valve 30 in the first example embodiment when the temperature of the hydraulic oil entering the thermo-valve 30 is high. As the temperature of the hydraulic oil 11 that directly enters the thermo-valve 30 from the first heat exchanger 40 becomes higher, the temperature of the wax 131 increases due to the heat transferred through the cylinder 36, and thereby the wax 131 expands accordingly.

As the wax 131 expands, the cylinder 36 moves relative to the thermo-element shaft 34 in the direction indicated by the arrow 109. At this time, the passage closing member 135 moves toward the first input port 144, so that the passage closing member 135 is pressed against the sidewall of the inner space 32 by the biasing force of the valve spring 133. In this way, the passage closing member 135 is forced into contact with the opening portion of the first input port 144, and the opening portion of the first input port 144 is closed. Consequently, the hydraulic oil from the first input port 144 is prevented from entering the thermo-valve 30. As indicated by the arrow 104, the hydraulic oil from the first input port 144 flows toward the second heat exchanger 50 via the second output port 146.

The valve spring 133 absorbs excess load that is exerted to the passage closing member 135 or to the cylinder 36 due to valve overshooting after the first input port 144 is blocked in response to an increase in the hydraulic oil temperature.

Meanwhile, as the cylinder 36 moves in the direction indicated by the arrow 109, the passage closing member 136 moves away from the contact portion 31a of the thermo-valve case 31, so that the second input port 142 opens. As indicated by the arrow 105, the hydraulic oil 12 enters the thermo-valve 30 via the second input port 142. As indicated by the arrow 102, the hydraulic oil is discharged out of the thermo-valve 30 via the first out port 143, and then enters the automatic transmission 10.

The travel of each of the passage closing member 135 and the passage closing member 136 changes according to the temperature of the hydraulic oil. Thus, the flow rates of the hydraulic oil introduced from the respective input ports may be adjusted as needed.

Figure 5:
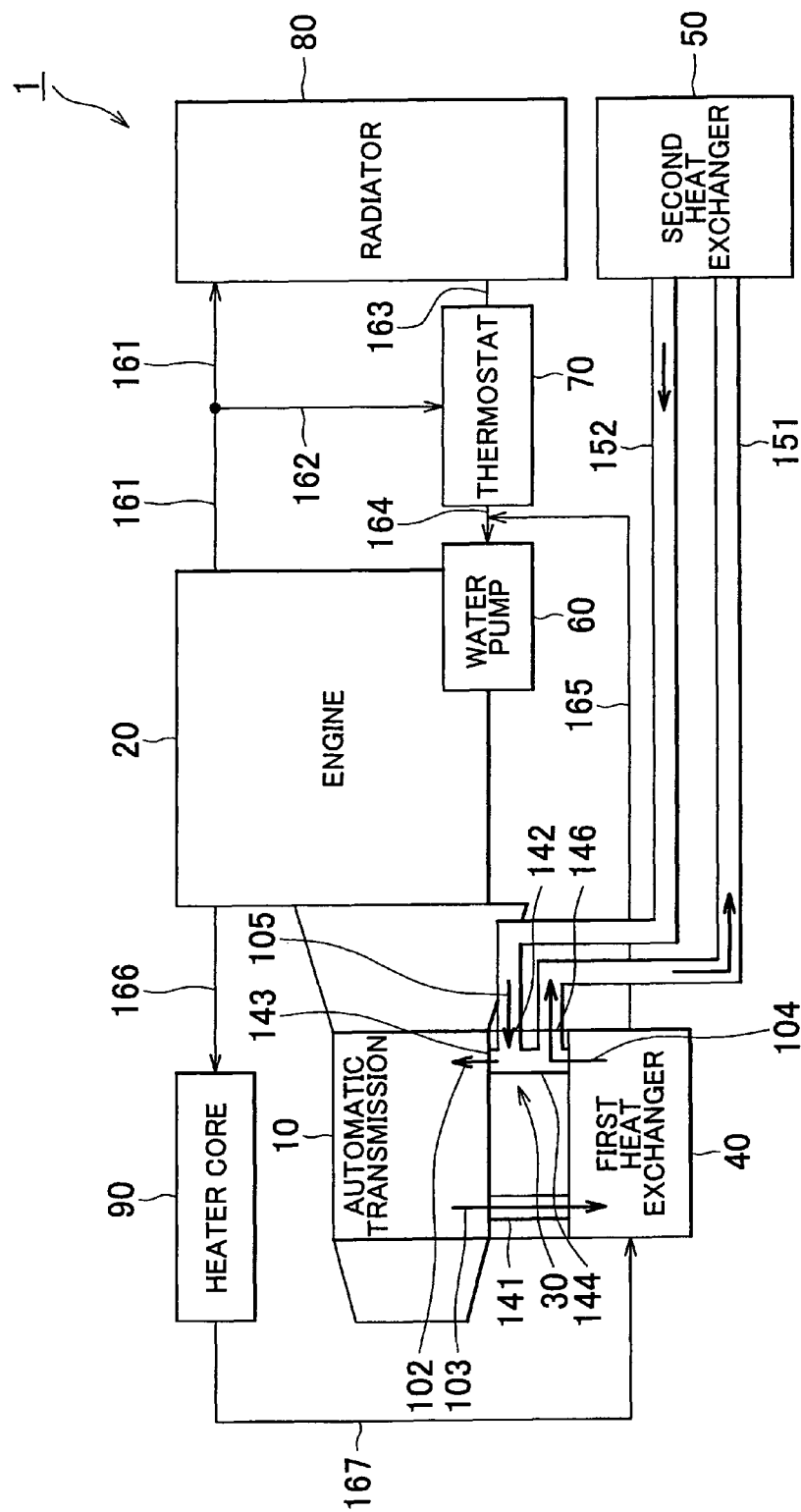
FIG. 5 is a block diagram showing the drive system in the first example embodiment when the temperature of the oil in the hydraulic circuit is high.

FIG. 5 is a block diagram showing the drive system 1 when the temperature of the hydraulic oil is high. Referring to FIG. 4 and FIG. 5, when the temperature of the hydraulic oil is high, the second input port 142 opens while the first input port 144 is blocked.

Because the first input port 144 is blocked, the hydraulic oil from the first heat exchanger 40 does not enter the thermo-valve 30 directly. That is, the hydraulic oil from the first heat exchanger 40 flows into the second heat exchanger 50 via the oil passage 151, as indicated by the arrow 104. At the second heat exchanger 50, the hydraulic oil is cooled by the ambient air, and the cooled hydraulic oil then flows into the thermo-valve 30 via the oil passage 152, as indicated by the arrow 105. Then, the hydraulic oil enters the automatic transmission 10 through the thermo-valve 30.

Therefore, in the cooling system of the first example embodiment, when the temperature of the hydraulic oil is relatively low, the hydraulic oil flows only through the first heat exchanger 40 and then returns to the automatic transmission 10. Conversely, when the temperature of the hydraulic oil is relatively high, the hydraulic oil flows through both the first heat exchanger 40 and the second heat exchanger 50, and then returns to the automatic transmission 10.

When the temperature of the hydraulic oil is low, because the hydraulic oil is heated promptly up to a normal operation temperature by means of the heat of the engine coolant, the time that it takes for the temperature of the hydraulic oil to reach a temperature for starting controls, such as lock-up control, is reduced. Also, the fuel economy is improved because the time operated under the condition that the viscosity of the hydraulic oil is low expands as the temperature of the hydraulic oil increases. Further, when the temperature of the hydraulic oil is high, the hydraulic oil may be cooled below an upper limit temperature by being circulated through both of the first heat exchanger 40 and the second heat exchanger 50.

When the temperature of the hydraulic oil is intermediate, the thermo-valve 30 may be operated by minute strokes repeatedly. Thus, the hydraulic oil cooled only by the first heat exchanger 40 and the hydraulic oil cooled by both of the first heat exchanger 40 and the second heat exchanger 50, are mixed in the thermo-valve 30 and then discharged from the output port 143. Consequently, the temperature of the hydraulic oil entering the automatic transmission 10 may be maintained substantially constant, and thereby the shift performance of the automatic transmission 10 may remain stable.

The thermo-valve 30 of the first example embodiment is a mechanical thermo-valve that controls flow rates of the fluid at two input passages and one output passage. The thermo-valve 30 of the first example embodiment switches the input flow channels by employing the lid-shape valves. Therefore, valve sliding failures due to eccentric load of the hydraulic valve, valve sliding failures due to foreign substances contained in the hydraulic oil, and oil leaks from gaps of the sliding valve, which are likely to occur in the slide-type valve, may be reduced considerably.

Referring to FIG. 3, when filling the hydraulic oil externally into the automatic transmission 10 and into the hydraulic circuit for the automatic transmission 10 in the first example embodiment, the hydraulic oil needs to fill up the automatic transmission 10, the oil passage 141, the first heat exchanger 40, the oil passage 151, the second heat exchanger 50, the oil passage 152, and the inside of the thermo-valve 30.

In the first example embodiment, because the hydraulic oil temperature is low at a room temperature, the second input port 142 of the thermo-valve 30 remains closed as described above. Thus, for example, if the hydraulic oil is fed externally into the automatic transmission 10, the automatic transmission 10, the first heat exchanger 40, and the thermo-valve 30 may be filled up with the hydraulic oil, while the oil passage 151, the second heat exchanger 50, and the oil passage 152 may be not filled up.

In this case, referring to FIG. 5, the oil passage 151, the second heat exchanger 50, and the oil passage 152 may be filled up with the hydraulic oil in such a manner that the hydraulic oil at a higher temperature is fed externally into the automatic transmission 10 in a state that the second input port 142 of the thermo-valve 30 is opened as the temperature of the hydraulic oil is raised. In this way, however, it takes a long time to fill up the entire hydraulic circuit.

Figure 6:
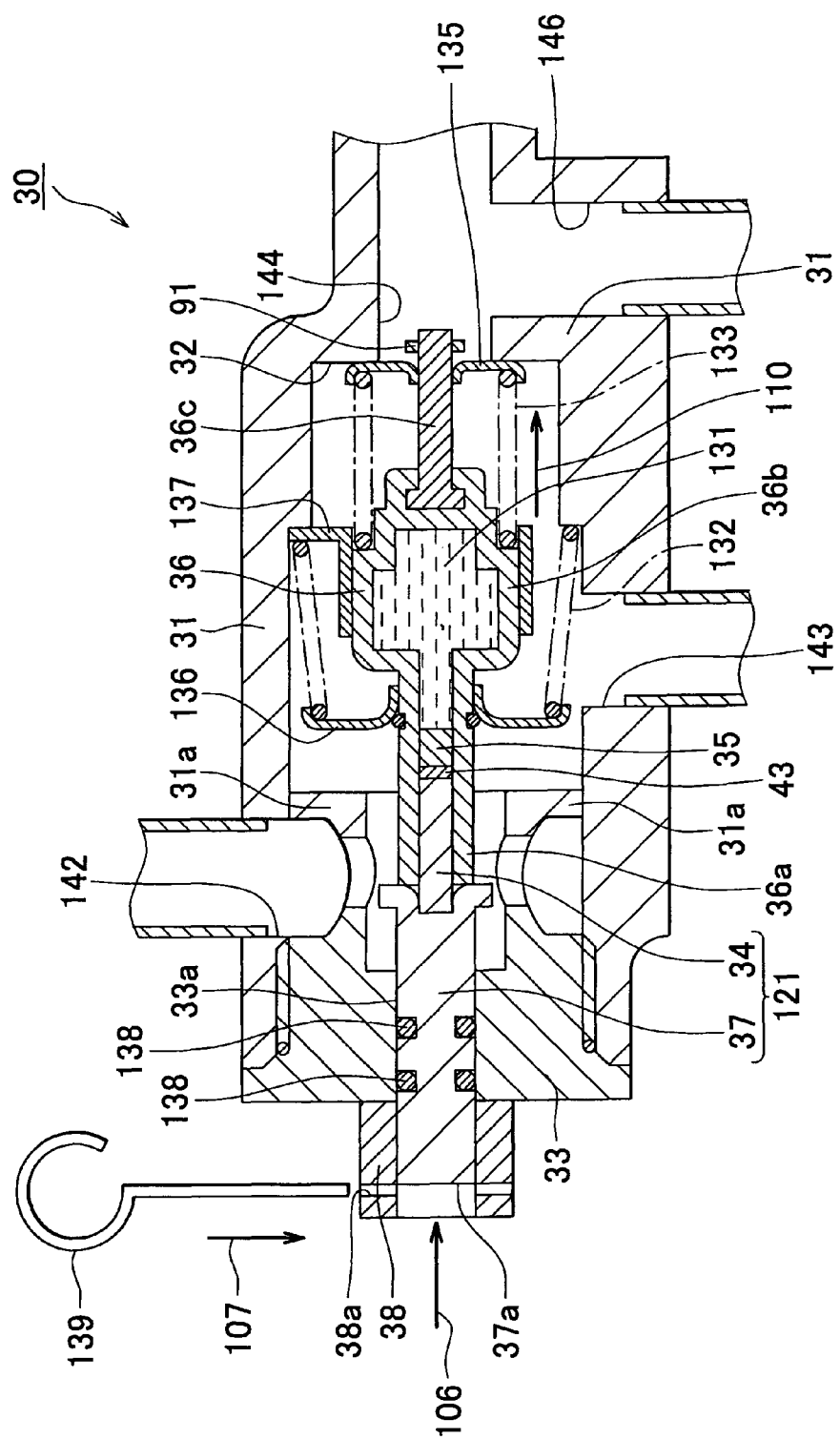
FIG. 6 is a cross-sectional view showing the flow channel switching device of the first example embodiment when the hydraulic circuit is filled up with the oil.

FIG. 6 is a cross-sectional view showing the thermo-valve 30 when the hydraulic oil is fed into the hydraulic circuit in the first example embodiment.

In the first example embodiment, the hydraulic oil at a lower temperature is fed into the hydraulic circuit. When the hydraulic oil is fed into the hydraulic circuit, the end face of the pushing shaft 37 of the shaft 121 is pushed toward the inside of the thermo-valve case 31 as indicated by the arrow 106 in FIG. 6. At this time, the thermo-element shaft 34 pressurizes the wax 131 filled in the cylinder 36, via the back-up plate 43 and the gasket 35.

As the wax 131 is pressurized, the cylinder 36 moves toward the first input port 144 as indicated by the arrow 110, and stops at a predetermined position where the cylinder 36 reaches when the temperature of the hydraulic oil flowing into the thermo-valve 30 is high. Also, the passage closing member 135 comes into contact with the opening portion of the first input port 144, thereby the first input port 144 is blocked. On the other hand, the passage closing member 136 that has blocked the second input port 142, moves away from the contact portion 31a of the thermo-valve case 31, thereby the second input port 142 is opened. As the first heat exchanger 40 is communicated with the second heat exchanger 50, the hydraulic circuit may be configured by the first heat exchanger 40, the second heat exchanger 50, and the thermo-valve 30 in sequence. Here, the direction indicated by the arrows 106, 110 may be regarded as one example of "predetermined direction" in the invention.

When the pushing shaft 37 is pushed inward as described above, the end face 37a of the pushing shaft 37 is seated beyond the insert holes 38a of the protruding portion 38. Then, for example, the pin 139 having an elongated shape as an external member, is inserted into one of the insert holes 38a. At this time, the cylinder 36 and the shaft 121 is biased toward the outside of the lid body 33 (i.e., the direction opposite to the arrow 106) due to the elastic force of the return spring 132. Therefore, the end face 37a of the pushing shaft 37 comes into contact with the inserted pin 139. Consequently, the positions of the cylinder 36 and the shaft 121 may be anchored by inserting the pin 139. That is, the cylinder 36 may be fixed by inserting the pin 139.

Figure 7:
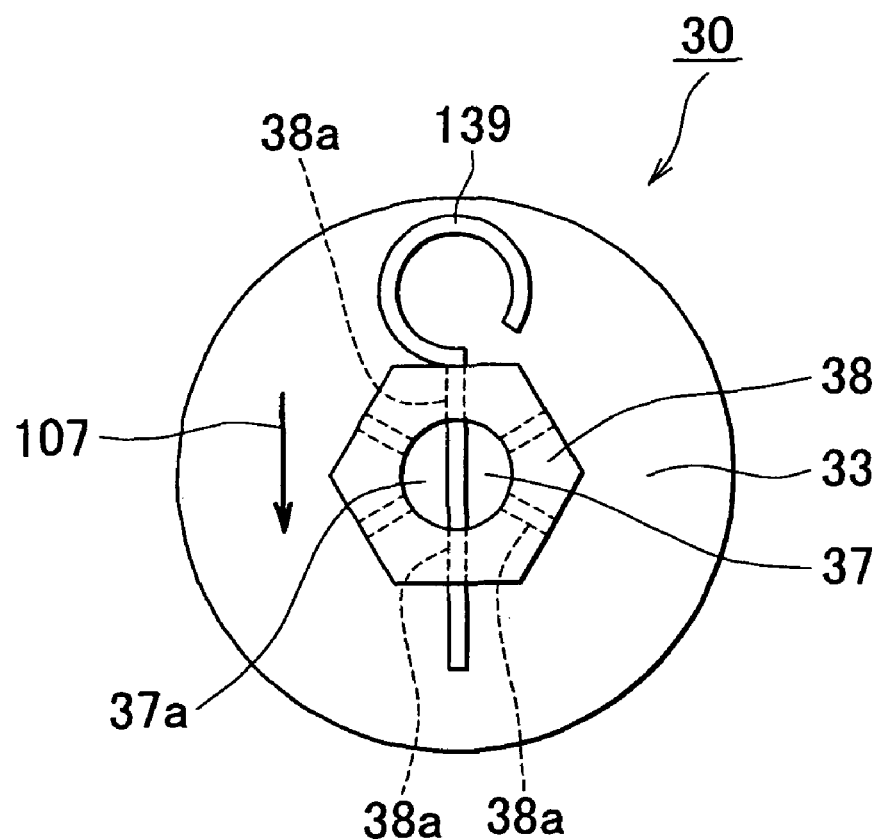
FIG. 7 is a side view of the flow channel switching device of the first example embodiment as viewed from the direction indicated by the arrow 106 in FIG. 6.

FIG. 7 is a side view of the thermo-valve 30 of the first example embodiment as viewed from the direction indicated by the arrow 106 in FIG. 6. Referring to FIG. 7, the pin 139 is inserted into one of the insert holes 38a along the direction indicated by the arrow 107 after pushing the pushing shaft 37 inward the thermo-valve 30 such that the end face 37a is seated beyond the insert holes 38a. The pin 139 penetrates the protruding portion 38. Thus, the pushing shaft 37 is prevented from falling out of the lid body 33 due to the pin 139 penetrating the protruding portion 38.

According to the first example embodiment, a plurality of the insert holes 38a are formed in the protruding portion 38 of the lid body 33. Each of the insert holes 38a is formed to extend in the different direction from the adjacent insert hole 38a. Thus, the pin 139 may be inserted from various angles, and thereby the working property may be improved.

By feeding the hydraulic oil into the hydraulic circuit after fixing the shaft 121 by the pin 139, the entire hydraulic circuit in addition to the second heat exchanger 50 may be filled up with the hydraulic oil. For example, by feeding the hydraulic oil at a low temperature into the automatic transmission 10, the automatic transmission 10 and the cooling system of the automatic transmission 10 may be filled up with the hydraulic oil.

According to the first example embodiment, the entire hydraulic circuit may be filled up with the hydraulic oil even when the temperature of the hydraulic oil is low. Thus, the feeding of the hydraulic oil may be performed simply and in a shorter time.

Further, the thermo-valve 30 of the first example embodiment provides the aforementioned advantages also when changing the hydraulic oil of the automatic transmission 10. For example, when discharging the hydraulic oil from the automatic transmission 10 during an oil change, or when feeding the hydraulic oil into the automatic transmission 10 during an oil change, the hydraulic oil may also be discharged from or fed into the automatic transmission 10 simply and in a shorter time.

In the first example embodiment, the return spring 132 for biasing the cylinder 36 and the shaft 121 toward the outside of the lid body 33 is provided, and the shaft 121 is fixed by the pin 139 that is inserted into one of the insert holes 38a formed in the protruding portion 38 to be in contact with the end face of the shaft 121. Thus, the position of the shaft 121 may be easily anchored. Also, because the cylinder 36 as the valve body is anchored using the removable pin 139, it is possible to anchor the valve body to the predetermined position or release the valve body without difficulty.

Meanwhile, referring to FIG. 6, after feeding the hydraulic oil into the entire hydraulic circuit, the pin 139 is pulled out. The cylinder 36 returns to the position where the cylinder is seated when the temperature of the hydraulic oil is low, as shown in FIG. 1, due to the elastic force of the return spring 132 as the biasing member, and thereafter the normal valve operation resumes.

In the first example embodiment, the hydraulic oil is fed into the hydraulic circuit after forcing the cylinder 36 to move to the predetermined position where the cylinder 36 reaches when the temperature of the hydraulic oil flowing into the thermo-valve 30 is high. Alternatively, the hydraulic oil may be fed into the hydraulic circuit in the following procedure: i) a portion of the hydraulic oil is first fed into the hydraulic circuit in a state that the cylinder 36 is seated when the temperature of the hydraulic oil is low, and then ii) the rest of the hydraulic oil is fed into the hydraulic circuit in a state that the cylinder 36 is forced to move to the predetermined position.

Further, in the first example embodiment, the hydraulic oil is fed into the hydraulic circuit in a state that the first input port 144 connected to the first heat exchanger 40, is blocked. Alternatively, the hydraulic oil may be fed into the hydraulic circuit in a state that the cylinder 36 is forced to hold at a middle position. That is, the hydraulic oil may be fed into the hydraulic circuit in a state that the first input port 144 and the second input port 142 are semiopen.

Further, in the first example embodiment, the shaft 121 is fixed by means of the pin 139. Alternatively, other forms and structures may be employed as long as the cylinder 36 as the valve body stops at the predetermined position.

In the first example embodiment, the shaft 121 includes the thermo-element shaft 34 and the pushing shaft 37. Furthermore, the thermo-element shaft 34 and the pushing shaft 37 are different members and joined together. Alternatively, the thermo-element shaft 34 and the pushing shaft 37 may be a single member.

In the first example embodiment, the invention is applied to the hydraulic circuit for the automatic transmission. However, the invention may be applied to a thermo-valve in a circuit for other fluid. For example, the invention may be applied to a heat exchanger for cooling an engine of a motor vehicle by means of a coolant.

Next, a thermo-valve according to the second example embodiment of the invention will be described with reference to FIG. 8 to FIG. 11. As in the first example embodiment, a thermo-valve 29 of the second example embodiment is arranged in a hydraulic circuit for an automatic transmission of a motor vehicle. The thermo-valve 29 of the second example embodiment differs from the thermo-valve 30 of the first example embodiment in the shaft fixing structure.

Figure 8:
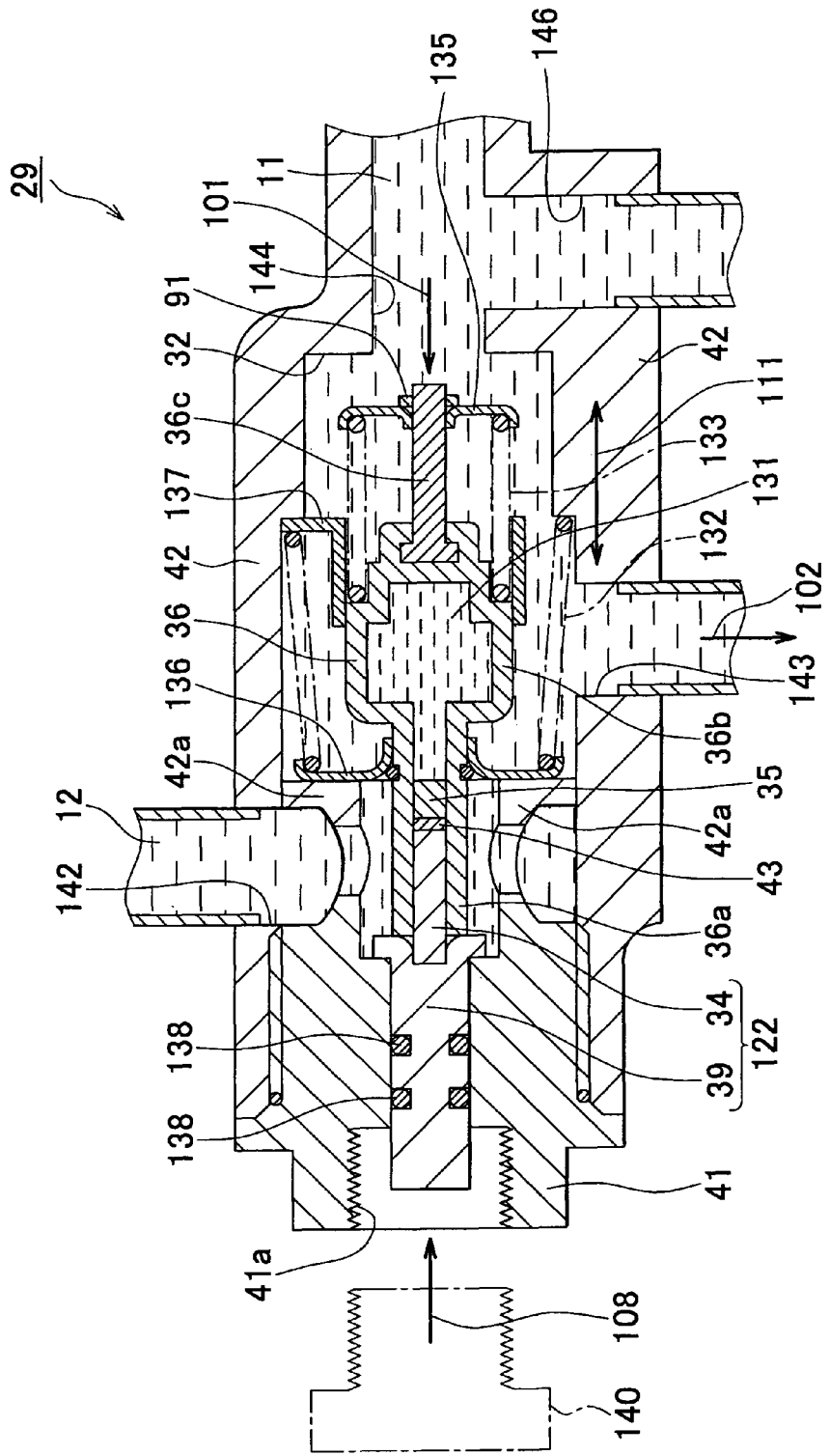
FIG. 8 is a cross-sectional view showing a flow channel switching device of the second example embodiment when the temperature of the oil in hydraulic circuit is low.

FIG. 8 is a cross-sectional view showing the thermo-valve 29 of the second example embodiment when the temperature of the hydraulic oil is low. A case of the thermo-valve 29 in the second example embodiment has a thermo-valve case 42 and a lid body 41.

The thermo-valve 29 has a shaft 122. The shaft 122 includes the thermo-element shaft 34 and a pushing shaft 39. The thermo-element shaft 34 and the pushing shaft 39 are joined together in the second example embodiment.

The lid body 41 has a concave portion 41a. The concave portion 41a is formed such that a portion of the push shaft 39 is exposed to the outside. The sidewall of the concave portion 41a is threaded. A screw member 140 as a removable member, may be screwed into the contact portion 31a.

When the temperature of the hydraulic oil is low, the second input port 142 is blocked because the passage closing member 136 is in contact with a contact portion 42a. On the other hand, the first input port 144 is open because the passage closing member 135 is away from the opening portion of the first input port 144.

Figure 9:
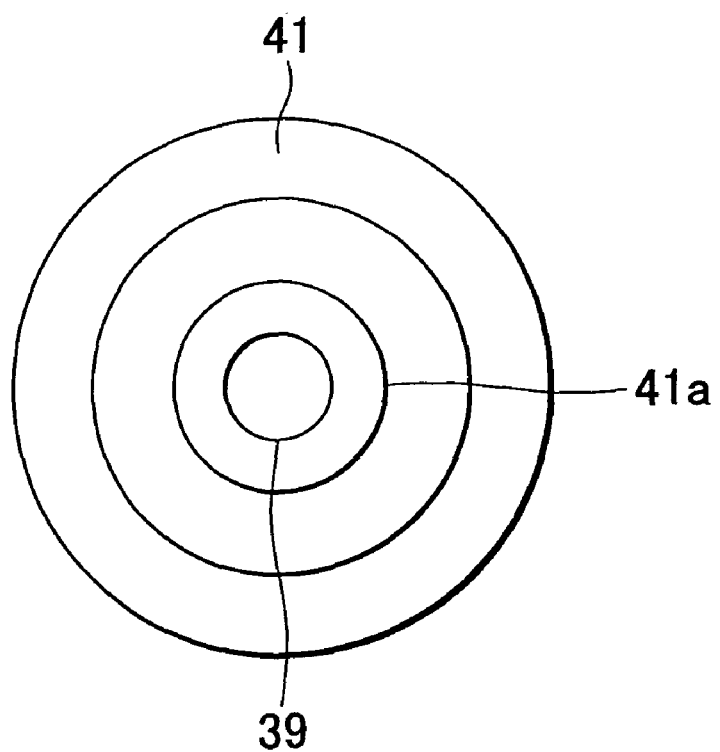
FIG. 9 is a side view of the flow channel switching device of the second example embodiment as viewed from the direction indicated by the arrow 108 in FIG. 8.

FIG. 9 is a side view showing the thermo-valve 29 of the second example embodiment as viewed from the direction indicated by the arrow 108 in FIG. 8. A side face of the lid body 41 is formed to be substantial circular, and a side face of the concave portion 41a is formed also to be substantial circular. The push shaft 39 is arranged substantially at the center of the concave portion 41a.

Figure 10:
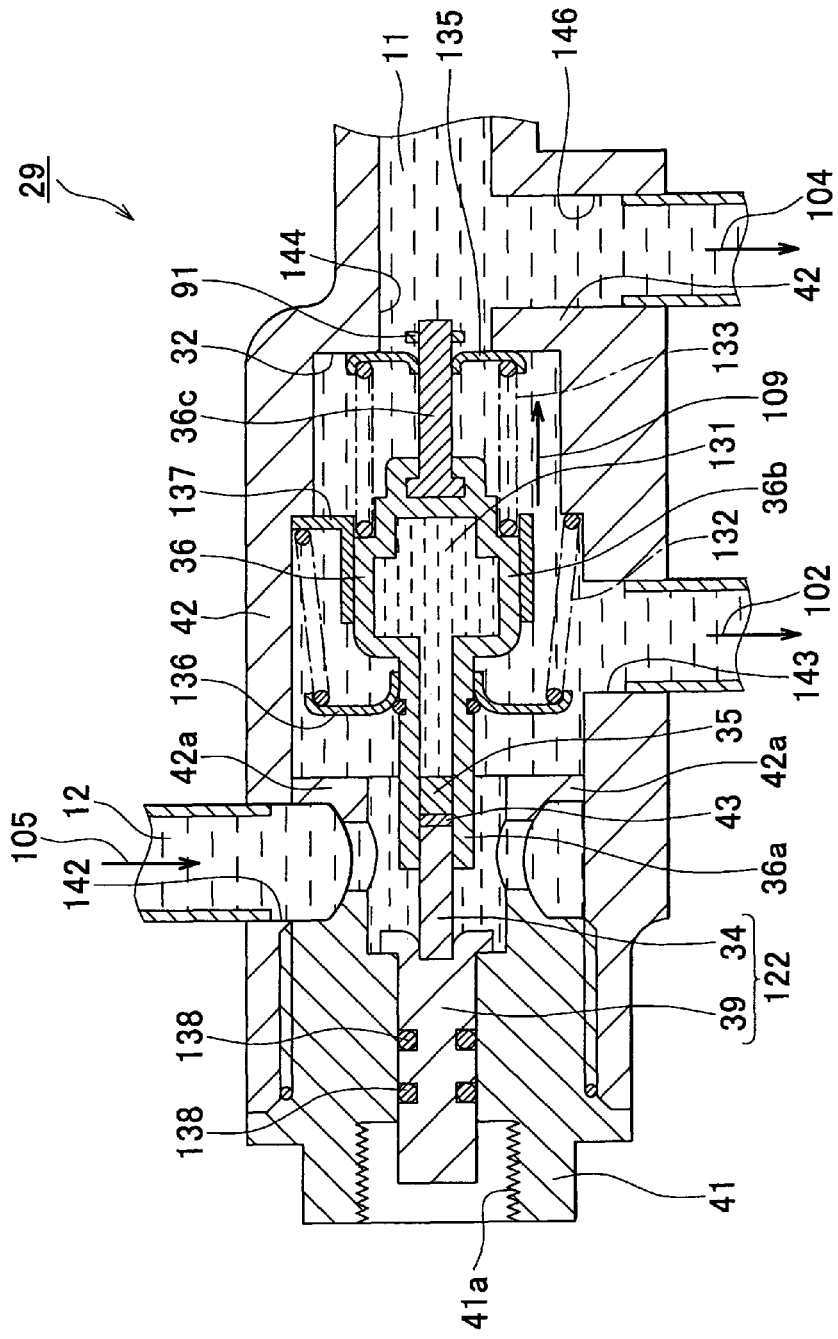
FIG. 10 is a cross-sectional view showing the flow channel switching device of the second example embodiment when the temperature of the oil in hydraulic circuit is high.

FIG. 10 is a cross-sectional view showing the thermo-valve 29 when the temperature of the hydraulic oil is high. As the temperature of the hydraulic oil becomes higher, the wax 131 in the cylinder 36 expands accordingly. As the wax 131 expands, the cylinder 36 moves toward the first input port 144, and thereby the passage closing member 135 comes to block the opening portion of the first input port 144. On the other hand, the passage closing member 136 moves away from the contact portion 12a of the thermo-valve case 42, and thereby the opening portion of the second input port 142 opens. During this time, the shaft 122 does not move, but the cylinder 36 moves relative to the shaft 122.

Figure 11:
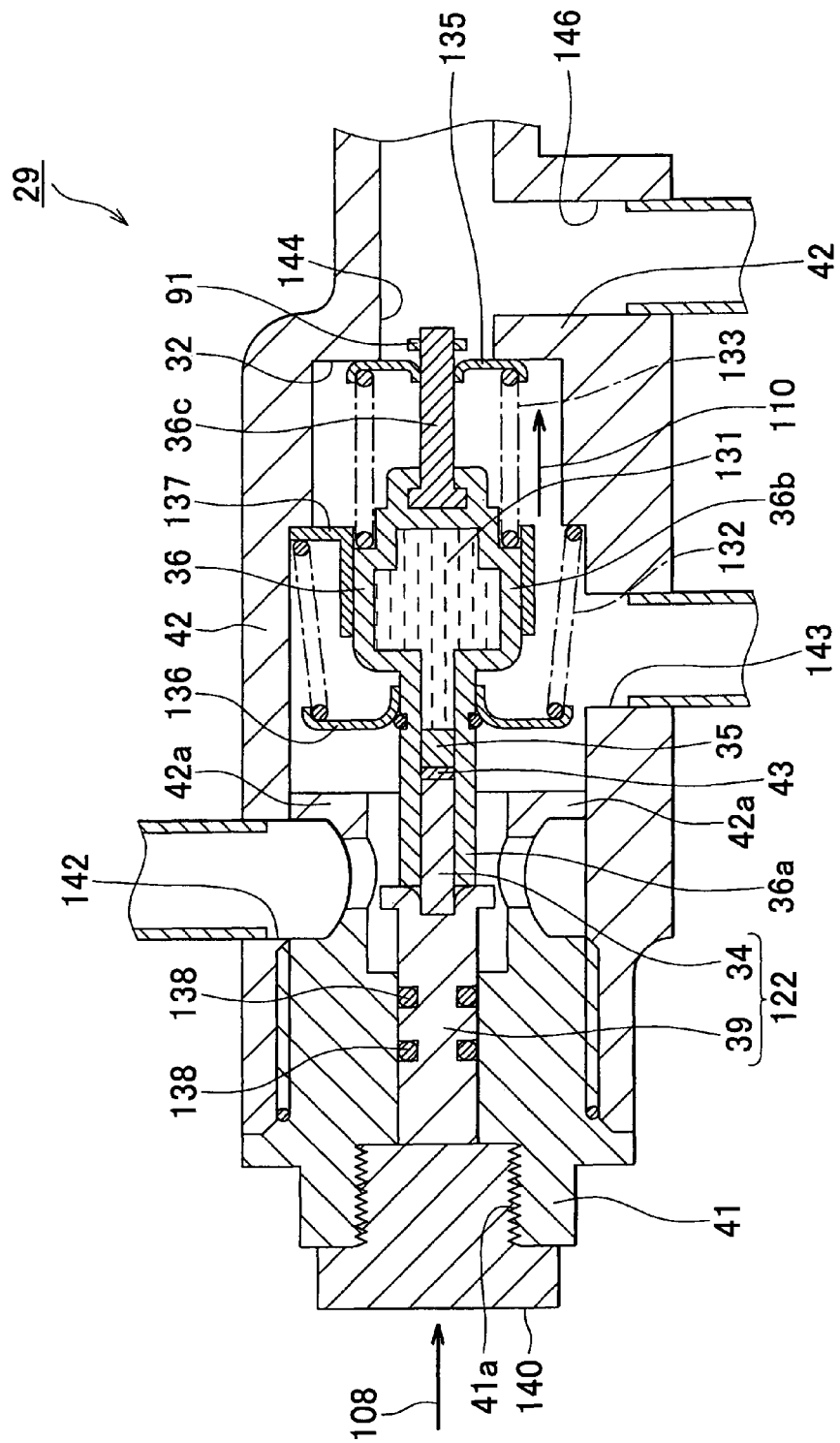
FIG. 11 is a cross-sectional view showing the flow channel switching device of the second example embodiment when the hydraulic circuit is filled up with the oil.

FIG. 11 is a cross-sectional view showing the thermo-valve 29 of the second example embodiment when feeding the hydraulic oil into the hydraulic circuit including the thermo-valve 29.

When feeding the hydraulic oil into the hydraulic circuit, the screw member 140 is screwed into the concave portion 41a of the lid body 41. As the screw member 140 is screwed into the concave portion 41a, the shaft 122 moves as indicated by the arrow 108. That is, the shaft 122 is pushed toward the inside of the thermo-valve case 42. Due to movement of the shaft 122, the wax 131 in the cylinder 36 is pressurized via the gasket 35, and thereby the cylinder 36 moves toward the first input port 144 as indicated by the arrow 110.

Then, the passage closing member 135 blocks the opening portion of the first input port 144. At this time, on the other hand, the passage closing member 136 moves away from the contact portion 42a of the thermo-valve case 42, and thereby the second input port 142 opens. Therefore, when feeding the hydraulic oil into the hydraulic circuit, the cylinder 36 is forced to move to the predetermined position where the cylinder 36 reaches when the temperature of the hydraulic oil flowing into the thermo-valve 30 is high even though the temperature of the hydraulic oil is still low. In the first and second example embodiments, the first input port 144 may be regarded as one example of "first input passage" in the invention, and the second input port 142 may be regarded as one example of "second input passage" in the invention.

In the second example embodiment, when feeding the hydraulic oil into the hydraulic circuit, the valve body may be forced to move to the predetermined position even though the temperature of the hydraulic oil is still low, and therefore the oil passages that are normally open at a higher temperature may also be filled up with the hydraulic oil.

In the second example embodiment, the concave portion 41a is provided, and the shaft 122 is pushed inward by means of the screw member 140 that is screwed into the concave portion 41a. Thus, the cylinder 36 may be moved to the predetermined position without difficulty. Also, the position of the shaft 122 may be finely adjusted by means of the screw member 140 when feeding the hydraulic oil into the hydraulic circuit.

Other structures, effects and advantages in the second example embodiment are similar to those in the first example embodiment, and therefore they are not described here again.

In the respective drawings, like elements and components are denoted by like numerals.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A flow channel switching device comprising:
a case that includes a plurality of flow passages that are communicated outside of the case, and
a valve body that is formed to move in the case, and switches the flow channel of the fluid in accordance with a temperature of the fluid, wherein the valve body is movable to a predetermined position and is fixable by an external member when the fluid at a low temperature is fed into a fluid circuit, and wherein
the plurality of flow passages includes a first input passage to the valve body that is open when the temperature of the fluid is low; and
a second input passage to the valve body that is open when the temperature of the fluid is high, and a predetermined position is a position in which the valve body is seated when the first input passage is blocked,
a shaft that supports the valve body such that the valve body moves in a predetermined direction; and
a wax that is provided in a space enclosed by the valve body and the shaft, the wax expands and contracts in accordance with the temperature of the fluid, wherein the valve body is moved in the predetermined direction by the wax expanding, a portion of the shaft is inserted in the valve body while another portion of the shaft is exposed to the outside of the case, and the shaft is supported by the case to move in the predetermined direction, when the fluid is fed into the fluid circuit, the valve body is moved in the predetermined direction by pushing the shaft inward, whereby the first input passage is blocked and the second input passage is opened, wherein the shaft is fixed by the external member in a state that the shaft is pushed in the predetermined direction, and the flow channel switching device further comprises a biasing member that biases the valve body in a direction opposite to pushing the shaft inward, and wherein the external member is a pin having an elongated shape, the case has an insert hole into which the pin is inserted, and the pin is inserted into the insert hole in a state that the shaft is pushed inward, whereby an end face of the shaft contacts with the inserted pin, and the shaft is fixed.

2. The flow channel switching device according to claim 1, wherein the external member is removable.

3. The flow channel switching device according to claim 1, wherein the fluid circuit is a hydraulic circuit for an automatic transmission.

4. The flow channel switching device according to claim 1, wherein the fluid circuit is a coolant circuit for an internal combustion engine.

5. The flow channel switching device according to claim 1, wherein
the valve body includes a first closing portion that blocks the first input passage; and
a second closing portion that blocks the second input passage, and the second closing portion is forced to move when a fluid is fed into the fluid circuit, and the second input passage opens.

6. The flow channel switching device according to claim 1, wherein the case further includes a protruding portion that has a plurality of insert holes extending in different directions from adjacent insert holes.

7. A flow channel switching device comprising:
a case that includes a plurality of flow passages that are communicated outside of the case; and
a valve body that is formed to move in the case, and switches the flow channel of the fluid in accordance with a temperature of the fluid, wherein the valve body is movable to a predetermined position and is fixable by an external member when the fluid at a low temperature is fed into a fluid circuit, and wherein
the plurality of flow passages includes a first input passage to the valve body that is open when the temperature of the fluid is low; and
a second input passage to the valve body that is open when the temperature of the fluid is high, and a predetermined position is a position in which the valve body is seated when the first input passage is blocked,
a shaft that supports the valve body such that the valve body moves in a predetermined direction; and
a wax that is provided in a space enclosed by the valve body and the shaft, the wax expands and contracts in accordance with the temperature of the fluid, wherein the valve body is moved in the predetermined direction by the wax expanding, a portion of the shaft is inserted in the valve body while another portion of the shaft is exposed to the outside of the case, and the shaft is supported by the case to move in the predetermined direction, when the fluid is fed into the fluid circuit, the valve body is moved in the predetermined direction by pushing the shaft inward, whereby the first input passage is blocked and the second input passage is opened, and wherein the case has a concave portion that is formed to expose the other portion of the shaft to the outside of the case, the external member is a screw member, the screw member is screwed into the concave portion, and the shaft is pushed in the predetermined direction by screwing the screw member into the concave portion when the fluid is fed into the fluid circuit.

8. The flow channel switching device according to claim 7, wherein the external member is removable.

9. The flow channel switching device according to claim 7, wherein the fluid circuit is a hydraulic circuit for an automatic transmission.

10. The flow channel switching device according to claim 7, wherein the fluid circuit is a coolant circuit for an internal combustion engine.

11. The flow channel switching device according to claim 7, wherein the valve body includes a first closing portion that blocks the first input passage; and a second closing portion that blocks the second input passage, and the second closing portion is forced to move when a fluid is fed into the fluid circuit, and the second input passage opens.

12. The flow channel switching device according to claim 7, wherein the shaft is fixed by the external member in a state that the shaft is pushed in the predetermined direction.

13. A method of filling a fluid circuit with oil, wherein
a thermo-valve is provided in the fluid circuit and switches a flow channel in accordance with a temperature of the oil,
the thermo-valve includes a case that includes a plurality of flow passages that are communicated outside of the case, and a valve body that is formed to move in the case, and switches the flow channel in accordance with the temperature of the oil;
when the temperature of the oil is low, the valve body is moved to a position at which the valve body is located when the temperature of the oil is high, and is fixed from outside of the case at the position;
the fluid circuit includes a first oil circuit and a second oil circuit;
when the temperature of the oil is low, the oil flows to the first oil circuit;
when the temperature of the oil is high, the oil flows to the second oil circuit;
a first heat exchanger, a second heat exchanger, and a passage that connects the first heat exchanger to the second heat exchanger are filled with the oil, when the temperature of the oil is low and the valve body is fixed from outside of the case at the position at which the valve body is located when the temperature of the oil is high;
the method includes: when the temperature of the oil is low, filling a low temperature-side passage with the oil; and when the temperature of the oil is low, filling a high temperature-side passage with the oil by fixing from outside of the case the valve body at the position at which the valve body is located when the temperature of the oil is high;
the thermo-valve includes a shaft that supports the valve body such that the valve body moves in one direction, and a wax that is provided in the valve body, and expands and contracts in accordance with the temperature of the oil;
a portion of the shaft is inserted in the valve body;
the wax is provided in a space enclosed by the valve body and the shaft;
when a temperature of the wax increases and the wax expands, the valve body moves in the one direction so that one of the plurality of flow passages is opened and a rest of the flow passages is blocked;
the shaft is supported by the case to move in the one direction;
a portion of the shaft is exposed to the outside of the case;
when the shaft is pushed inward, the valve body moves in the one direction so that the one of the plurality of flow passages is opened and the rest of the flow passages is blocked;
the shaft is fixed at a position to which the shaft has been pushed inward in the one direction; and
the valve body is fixed by a removable member.

* * * * *